United States Patent
Duke

(10) Patent No.: US 8,939,804 B2
(45) Date of Patent: Jan. 27, 2015

(54) WAVE-POWERED AUTONOMOUS PLANKTON COLLECTOR

(76) Inventor: John Hincks Duke, Providence, RI (US)

(*) Notice: Subject to any disclaimer, the term of this patent is extended or adjusted under 35 U.S.C. 154(b) by 0 days.

(21) Appl. No.: 13/534,644

(22) Filed: Jun. 27, 2012

(65) Prior Publication Data

US 2012/0329345 A1  Dec. 27, 2012

Related U.S. Application Data

(60) Provisional application No. 61/501,735, filed on Jun. 27, 2011.

(51) Int. Cl.
| | |
|---|---|
| *B63H 19/02* | (2006.01) |
| *B63G 8/08* | (2006.01) |
| *F03B 13/20* | (2006.01) |
| *B63J 3/04* | (2006.01) |
| *B63G 8/00* | (2006.01) |

(52) U.S. Cl.
CPC . *B63G 8/08* (2013.01); *F03B 13/20* (2013.01); *B63J 3/04* (2013.01); *B63G 8/001* (2013.01); *B63H 19/02* (2013.01); *B63B 2211/02* (2013.01); *B63G 2008/002* (2013.01); *B63G 2008/004* (2013.01); *Y02E 10/38* (2013.01); *Y02T 70/59* (2013.01)
USPC ............................................................. 440/9

(58) Field of Classification Search
USPC ............................................................. 440/9
See application file for complete search history.

(56) References Cited

U.S. PATENT DOCUMENTS

| | | | | |
|---|---|---|---|---|
| 2,720,047 | A * | 10/1955 | Isaacs | 43/7 |
| 3,872,819 | A * | 3/1975 | Pickens | 440/9 |
| 4,137,772 | A * | 2/1979 | Hitch | 73/863.23 |
| 4,151,423 | A * | 4/1979 | Hendel | 290/42 |
| 5,578,768 | A * | 11/1996 | Phillips | 73/863.23 |
| 7,063,579 | B2 * | 6/2006 | Voves | 440/3 |
| 2011/0095530 | A1 * | 4/2011 | Blumer et al. | 290/43 |
| 2012/0289103 | A1 * | 11/2012 | Hudson et al. | 440/38 |
| 2013/0006445 | A1 * | 1/2013 | Hine | 701/2 |

* cited by examiner

*Primary Examiner* — Lars A Olson
*Assistant Examiner* — Jovon Hayes

(57) ABSTRACT

An autonomous submersible vessel employs ambient wave energy to both propel itself and to generate required onboard electrical power. The vessel comprises a ballast stabilized stator portion and a rotor portion with wings rotated by wave-induced orbital water particle motion. Phased power generation resists rotor portion rotation when the horizontal component of water motion is in the desired direction of navigation, so increased hydrodynamic drag at that time acts to pull the vessel forward. The vessel further comprises a means to collect and preserve plankton samples. The vessel design enables alternate operation as an oceanographic glider to also navigate in deep water and in calm seas.

11 Claims, 5 Drawing Sheets

WAVE-POWERED AUTONOMOUS PLANKTON COLLECTOR

1. BACKGROUND OF THE INVENTION

Presently accelerating ocean acidification is a potential threat to calcareous plankton that are vital to Earth's carbon cycle. This risk is particularly acute in the Southern Ocean because it is a large natural carbon dioxide sink, and the saturation of calcium carbonate in sea water is at greater risk in colder water. A means to economically increase surveillance of Southern Ocean acidification effects is valuable, particularly in southern winter when natural biological utilization of dissolved carbon dioxide is lowest. In addition to measuring and recording temperature, salinity, acidity, transparency, and phosphorescence of Southern Ocean waters, it will be valuable to continually collect actual samples of plankton at different seasons, times of day, water depths, and locations to discern their physiological response over time to the chemical stress of increasing acidity.

Because the Southern Ocean is the world's most hostile marine environment, deployment of autonomous vessels for the above purpose is economically preferable to manned survey ships. Operation of autonomous vessels for long periods of time in remote locations requires a renewable energy source. Pickens, in U.S. Pat. No. 3,872,819, and Hine et al., in U.S. Pat. No. 8,043,133, describe a surface vessel tethered to a subsurface device that develops horizontal propulsion from wave induced vertical motion. However, this arrangement does not permit deep water collection and is at risk of damage from floating ice. Also, the later invention employs solar power for instrumentation and communication, which is not available at high latitudes during critical winter months.

Here I describe a vessel that can harness subsurface wave energy to provide both propulsion and electrical power for onboard systems. It contains an automated means to collect and preserve plankton. The vessel may alternatively operate at depth and in calm seas by the known means of oceanographic gliders.

2. DESCRIPTION OF THE FIGURES

Figure 1:
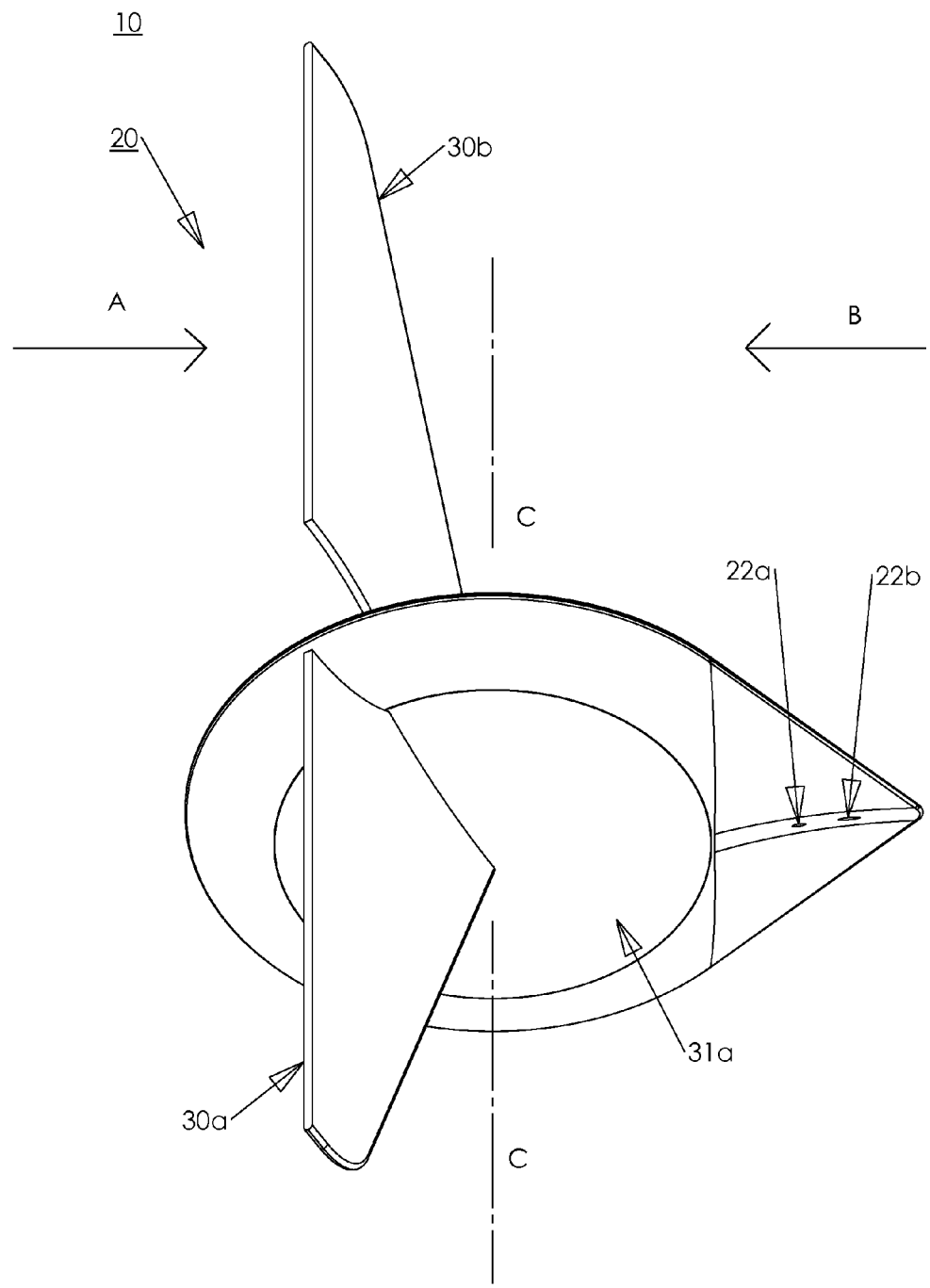

FIG. 1: A perspective view,
FIG. 2: A transparent downward view,
FIG. 3: A transparent sideward view,
FIG. 4: An exploded view, and
FIG. 5: A series of diagrams of wave orbit propulsion phases.

3. SPECIFICATION

Figure 4:
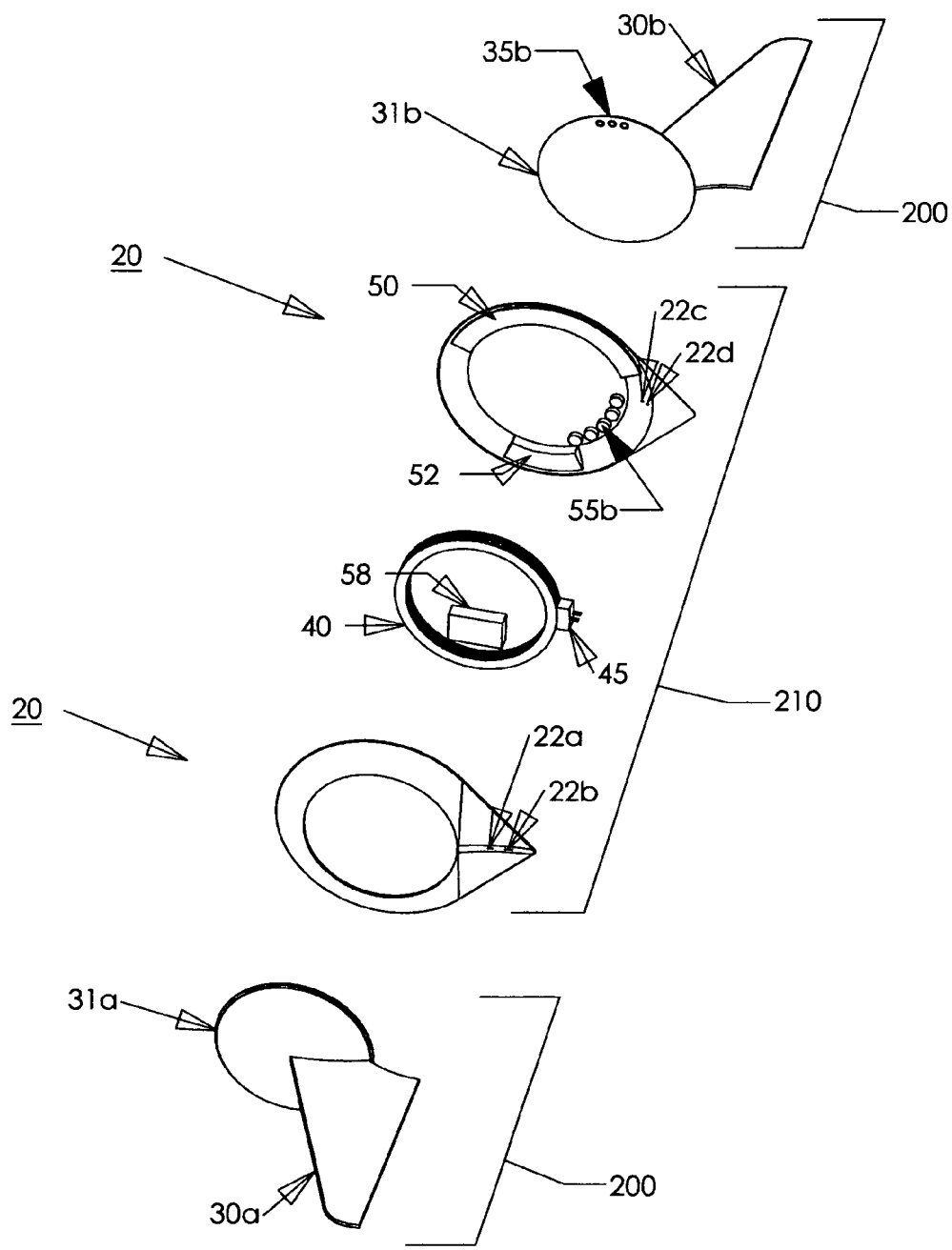

In FIG. 1, a volume of water 10 with surface waves propagating in a direction A envelops a vessel 20 being propelled in a direction B. Vessel 20 incorporates a forward portion and an aft portion that is oriented in service so the aft portion is in direction A of the forward portion. A set of plankton collection input ports 22a, 22b, 22c shown in FIGS. 4, and 22d shown in FIG. 4 communicate with the interior aft portion of vessel 20. A pair of wings 30a and 30b are independently rotatable about a central transverse axis C of vessel 20, and the longitudinal chords of wings 30a and 30b are substantially radial to axis C. Wings 30a and 30b respectively connect to a pair of hubs 31a and 31b shown in FIG. 4. The centroids of wings 30a and 30b are offset from axis C so that movement of water contacting wings 30a and 30b tends to rotate the longitudinal chords of wings 30a and 30b parallel to that water movement. Wings 30a and 30b and hubs 31a and 31b are substantially neutrally buoyant with respect to water 10.

Figure 2:
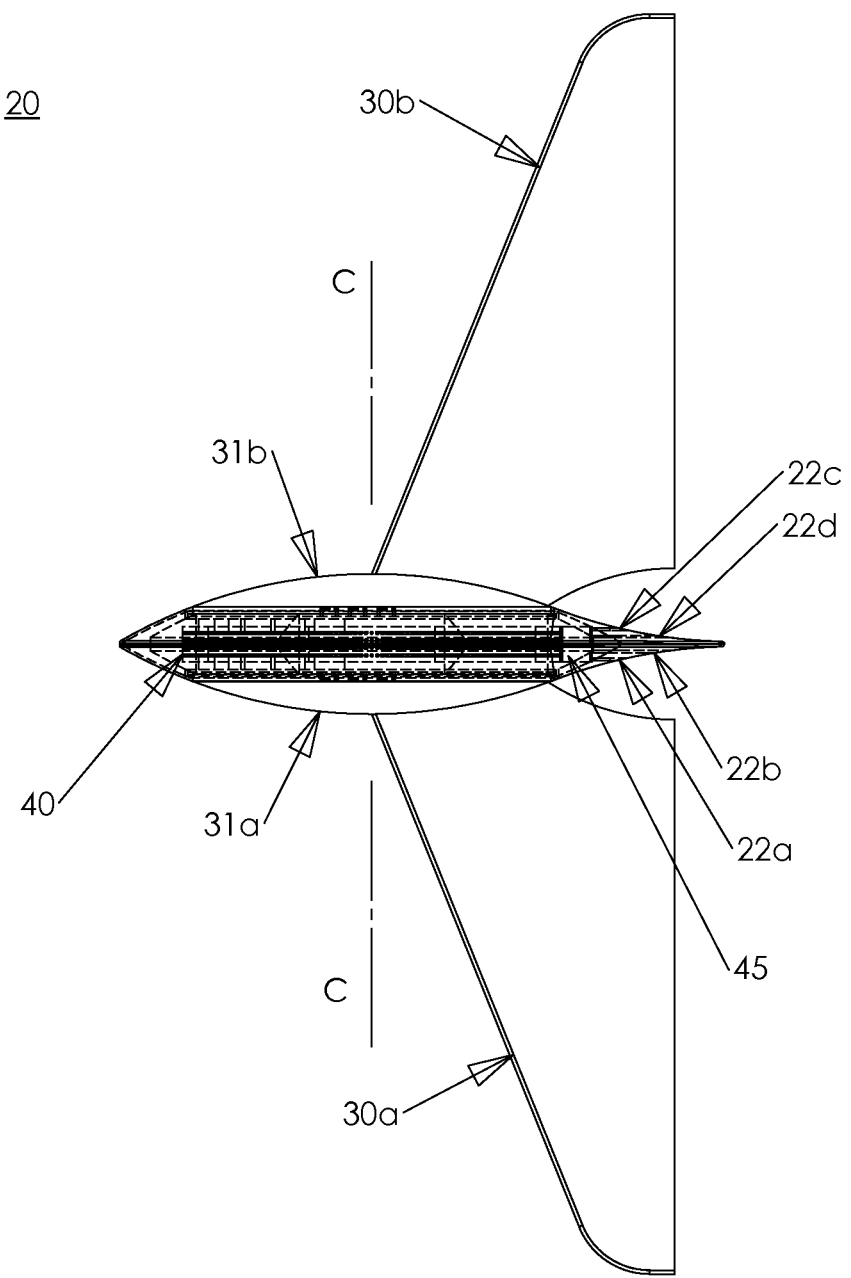

FIG. 2 further shows the transverse location within vessel 20 of a rotatable sample collector 40 and a sample injector 45 that communicates with input ports 22a, 22b, 22c, and 22d. Injector 45 and/or the surface of vessel 20 may also incorporate known means not shown to measure and record the temperature, salinity, acidity, transparency, and phosphorescence of water 10.

Figure 3:
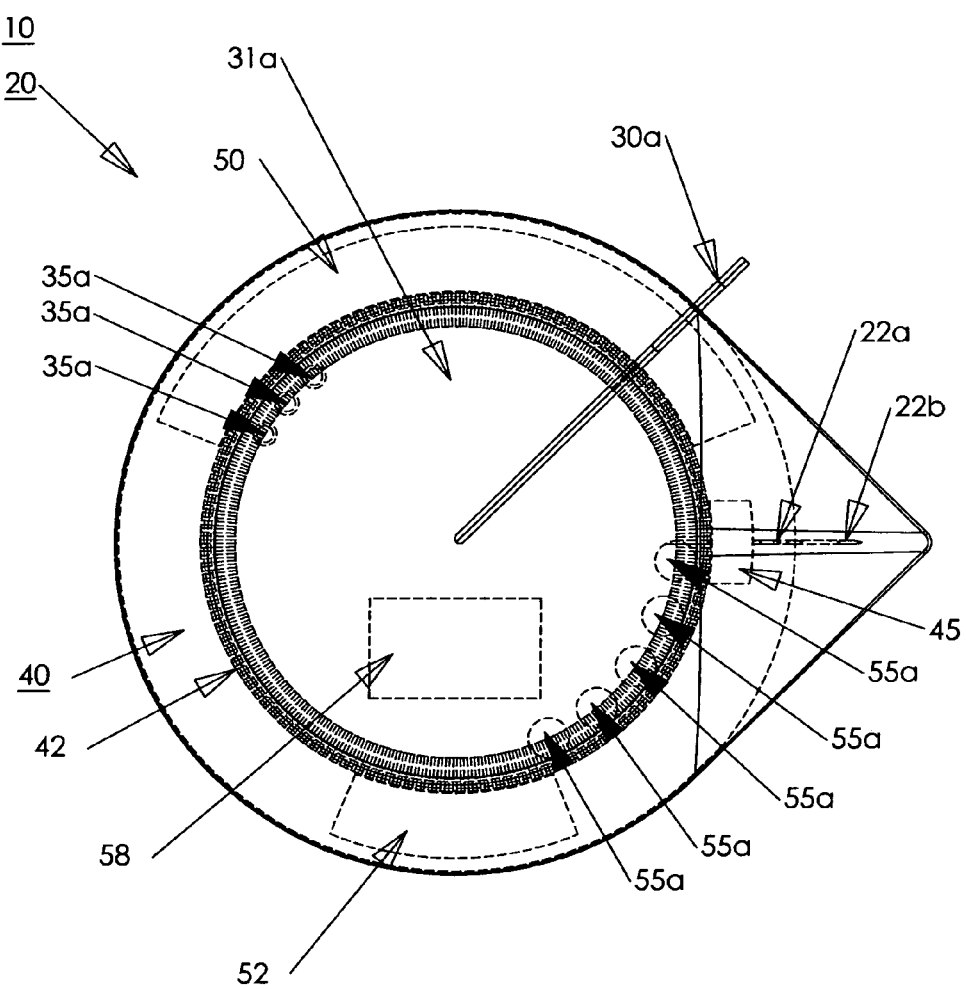

FIG. 3 further shows a set of one or more permanent magnets 35a and 35b shown in FIG. 4 that are respectively integral to a portion of the periphery of hubs 31a and 31b. A set of electrical coils 55a and 55b shown in FIG. 4 are integral to a portion of the interior of vessel 20 substantially co-radial with magnets 35a and 35b. Magnets 35a and 35b are positioned to excite coils 55a and 55b when the horizontal component of wave-induced orbital water 10 particle motion is in direction B, as described with reference to FIG. 5. A buoyancy compartment 50 is integral to the upper interior of vessel 20 and a ballast compartment 52 is integral to the lower interior of vessel 20. A control module 58 that provides energy and buoyancy management means is also integral to the lower interior of vessel 20. Collector 40 comprises a set of substantially radial compartments 42 that contain a preserving solution under partial vacuum sealed by an injectable elastometric material. Injector 45 comprises a means to index compartments 42 by rotating collector 40 within the substantially co-radial central surfaces of injector 45, buoyancy compartment 50, and ballast compartment 52. Injector 45 further comprises means to sequentially concentrate and inject samples of plankton into compartments 42. In the preferred embodiment the number of compartments 42 is sufficient to collect a daytime and a nighttime sample for more than 365 days.

FIG. 4 shows the preferred construction arrangement in which vessel 20, buoyancy compartment 50, and ballast compartment 52 are separable about a vertical longitudinal plane. FIG. 4 further designates a rotor portion 200 comprised of wings 30a and 30b, hubs 31a and 31b, and magnets 35a and magnets 35b not shown, and a stator portion 210 comprised of vessel 20, coils 55a not shown and coils 55b, and other elements within vessel 20. Rotor portion 200 and stator portion 210 compose a pair of independently rotatable electrical generators.

Figure 5:
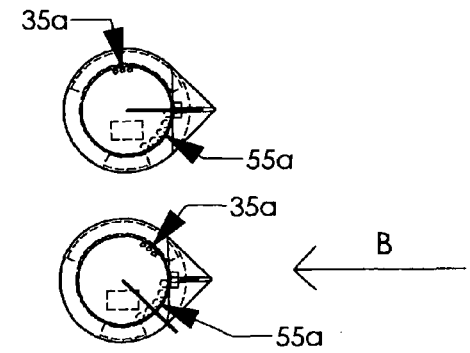

FIG. 5 shows a series of eight wave orbit phase diagrams 100a, 100b, 100c, 100d, 100e, 100f, 100g, and 100h that indicate a sequence of directions of water particles in a wave propagating in direction A. This sequence is in 45 degree increments indicated numerically. A detail view adjacent to each phase diagram indicates the corresponding orientation of wings 30a and 30b.

In alternative embodiments the function of magnets 35a and 35b and coils 55a and 55b may be provided by rotary positive displacement pump devices coupled to electrical generators.

4. OPERATION

In the preferred embodiment vessel 20 is both autonomous in service and remotely controllable through a known retractable and buoyant telecommunication antenna not shown.

The relative masses and arrangement of buoyancy compartment 50, ballast compartment 52, and control module 58 act to maintain level trim angle and heel angle of vessel 20. When stabilized in this way, the transverse span of wings 30a and 30b acts to maintain axis C approximately parallel to the prevailing wave front. Wave induced orbital changes in the direction of water 10 with respect to vessel 20 then act to rotate wings 30a and 30b and hubs 31a and 31b about axis C.

When magnets 35a and 35b excite coils 55a and 55b, magnetic resistance to the rotation of wing 30a and wing 30b both generates electrical power and increases the angle of attack of wing 30a and wing 30b, which periodically increases hydrodynamic drag in direction B to propel vessel 20 in direction B. With reference to FIG. 5, diagram 100a shows wave crest passage, when water particle motion is in direction A. Magnets 35a and 35b are in a no-load position at this time, so wings 30a and 30b freely weathervane in that direction. Magnets 35a and 35b remain in a no-load position for the subsequent 90 degrees of particle orbit rotation, equal to ¼ wavelength of wave propagation, as shown in FIGS. 100b and 100c. Magnets 35a and 35b then excite coils 55a and 55b in a load phase for the subsequent 180 degrees of particle orbit, as shown in FIGS. 100d, 100e, 100f, and 100g. In the preferred embodiment the wing 30a and wing 30b angle of attack is 30 degrees in the position of FIG. 100d, and is 60 degrees in the positions of FIGS. 100e and 100f. During this rotary power generating interval the horizontal component of water particle motion is in direction B, so the resulting impulse force on wings 30a and 30b acts to propel vessel 20 in direction B. At the position of FIG. 100g, the horizontal component of water 10 motion in direction B then diminishes to zero, at which time magnets 35a and 35b rotate past coils 55a and 55b to a no-load position in which wings 30a and 30b weathervane again. This provides a means by which vessel 20 may hold position against prevailing wind drift currents, such as the Antarctic Circumpolar Current.

To steer vessel 20 in a given direction, control module 58 varies the electrical current in coils 55a and 55b to lessen load phase hydrodynamic drag on that side of vessel 20. By this means, control module 58 acts to turn axis C marginally out of parallel with the prevailing wave front. While FIG. 5 shows vessel 20 direction B in opposition to wave propagation direction A, vessel 20 may also reverse direction, in which case the load phase coincides with wave crest passage rather than wave trough passage. Vessel 20 may navigate perpendicular to wave propagation direction A by a zig-zag combination of direction reversal and sideward steering.

In the preferred embodiment control module 58 also incorporates known means to hold hubs 31a and 31b near position 100a and operate vessel 20 as an oceanographic glider. This enables deep water operation and calm sea navigation over limited distances.

The above means to steer and propel vessel 20 provides a capability to economically navigate.

Control module 58 further incorporates a means to compensate for changes in buoyancy resulting from plankton sample collection.

It will be understood that the principle of operation disclosed here may be embodied in other ways. For example, in one alternative embodiment, vessel 20 supports one or more one-way flap devices that open when instantaneous wave orbit direction aligns with the navigational objective. In such a case the power take-off may utilize the opening or linear translation of such flap devices.

I claim:

1. A vessel that comprises:
    a ballast stabilized stator portion,
    a rotor portion that rotates about a vessel axis in response to wave-induced orbital water particle motion, and
    one or more power generators driven by the relative rotation of the rotor portion about the stator portion, where the generators are configured to phase power generation when the horizontal component of water motion is in a desired direction of navigation.

2. The vessel of claim 1 in which the rotor portion further comprises one or more wings with centroids that are offset from the axis of rotor portion rotation.

3. The vessel of claim 2 in which the angle between wing longitudinal chords and the water particle motion direction is between ten and seventy degrees when water particle motion is in a desired direction of navigation.

4. The vessel of claim 2 in which the wings weathervane when water particle motion is not in a desired direction of navigation.

5. The vessel of claim 1 in which said rotor portion comprises one or more permanent magnets and said stator portion comprises one or more electrical coils.

6. The vessel of claim 1 containing a plankton collection and preservation means with injectable sealed compartments that are under partial vacuum prior to plankton collection.

7. The vessel of claim 1 in which active buoyancy control enables combined operation as an oceanographic glider.

8. A combined method of propelling a vessel and generating onboard power, the method comprising:
    operating in a volume of water with wave-induced orbital water particle motions,
    moving a set of one or more vessel appendages with respect to the vessel in response to a hydrodynamic force of the wave-induced orbital water particle motions,
    generating power by appendage movement in phase with water particle motion in a desired direction of navigation,
    resisting appendage movement in equal and opposite reaction to the power generating force according to Newton's Third Law,
    increasing hydrodynamic drag on the appendages resulting from resistance to appendage movement, and
    propelling the vessel in the desired direction of navigation by phased hydrodynamic drag in the desired direction of navigation.

9. The method of claim 8 in which said power generating means is a rotary electrical generator.

10. The method of claim 8 in which said power generating means is a linear electrical generator.

11. The vessel of claim 2 which steers by variation in power generation on one or both of its sides.

* * * * *